United States Patent [19]
Welsch et al.

[11] Patent Number: 5,502,740
[45] Date of Patent: Mar. 26, 1996

[54] STRIPLINE LASER RESONATOR

[75] Inventors: Wolfgang Welsch, Baldham; Hans Krueger, Munich; Peter Mammach, Unterhaching; Klemens Huebner, Ottobrunn; Karlheinz Arndt, Munich, all of Germany

[73] Assignee: Siemens Aktiengesellschaft, Munich, Germany

[21] Appl. No.: 115,408

[22] Filed: Aug. 31, 1993

[30] Foreign Application Priority Data

Aug. 31, 1992 [EP]  European Pat. Off. .............. 92114861

[51] Int. Cl.⁶ .................................................. H01S 3/097
[52] U.S. Cl. .................. 372/82; 372/34; 372/87; 372/107; 372/65
[58] Field of Search .................. 372/61, 65, 95, 372/87, 64, 107, 34

[56] References Cited

U.S. PATENT DOCUMENTS

| | | |
|---|---|---|
| 4,939,738 | 7/1990 | Opower . |
| 5,123,028 | 6/1992 | Hobart et al. .............. 372/64 |
| 5,197,079 | 3/1993 | Kreuger et al. .............. 372/87 |
| 5,220,576 | 6/1993 | Krueger et al. .............. 372/82 |
| 5,231,644 | 7/1993 | Krueger et al. .............. 372/87 |
| 5,293,573 | 3/1994 | Welsch et al. .............. 372/82 |

FOREIGN PATENT DOCUMENTS

| | | |
|---|---|---|
| 0305893 | 8/1988 | European Pat. Off. . |
| 0477865 | 9/1991 | European Pat. Off. . |
| 0477880 | 9/1991 | European Pat. Off. . |
| 54-51398 | 4/1979 | Japan . |
| 60-147184 | 8/1985 | Japan . |
| 1-22079 | 1/1989 | Japan . |

OTHER PUBLICATIONS

"Diffusion–cooled Compact $CO_2$ High Power Lasers", Laser und Optoelektronik, vol. 23(3), 1991, pp. 68–82. (No Month).

*Primary Examiner*—Leon Scott, Jr.
*Attorney, Agent, or Firm*—Hill, Steadman & Simpson

[57]  ABSTRACT

In a stripline laser, the spacer rods are traversed by coolant, and are of composite structure for compensating the longitudinal expansions and define the invariant spacing of the two resonator mirrors that are indirectly firmly joined with the spacer rods.

13 Claims, 1 Drawing Sheet

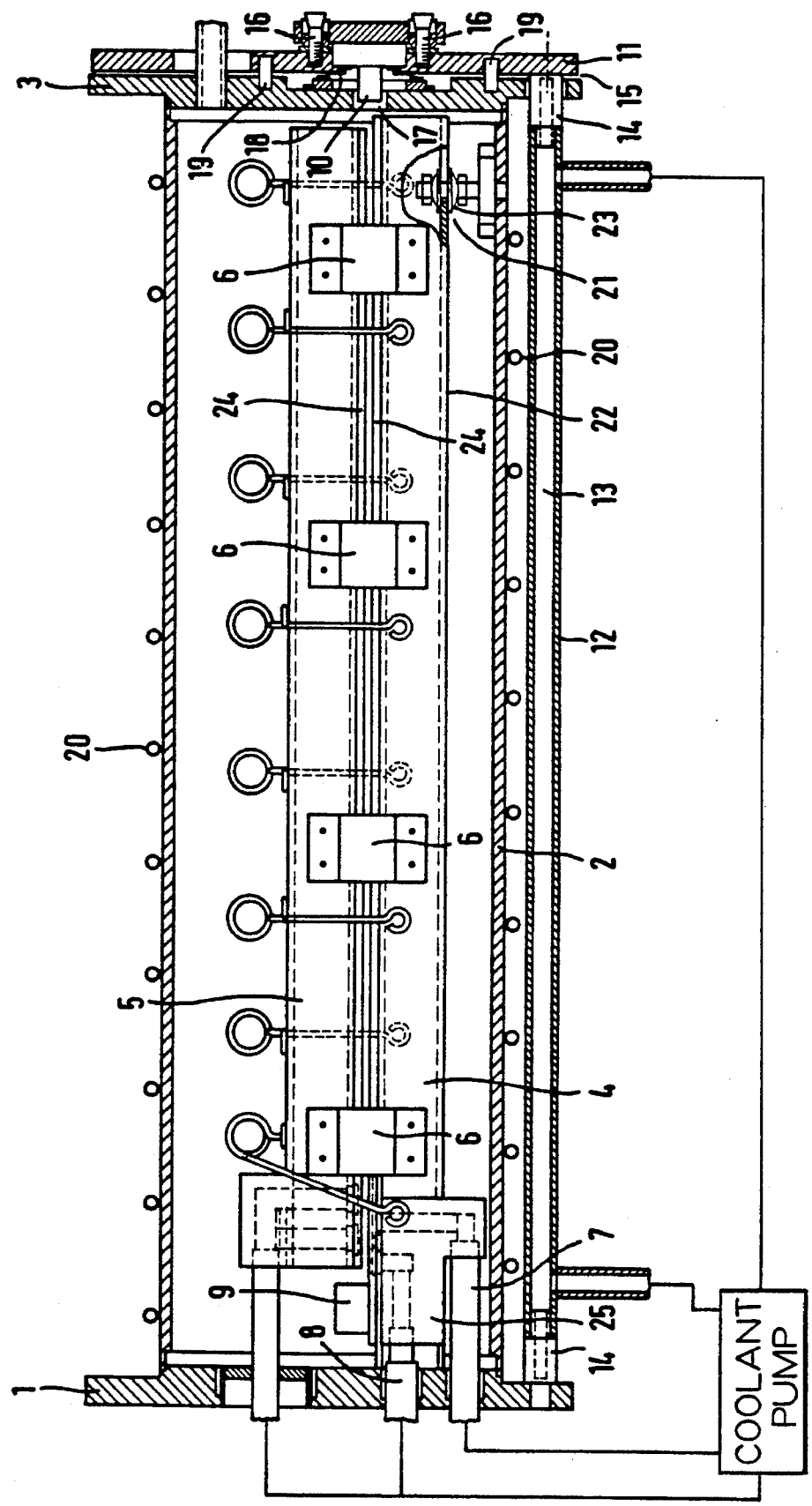

STRIPLINE LASER RESONATOR

BACKGROUND OF THE INVENTION

1. Field of the Invention

The invention is directed generally to a gas laser, and more particularly to a radio-frequency, diffusion-cooled stripline laser having two metal electrodes provided with means for cooling and with means for mutual fixing of the electrodes so that a discharge gap is formed between them, having an unstable resonator whose first resonator mirror is firmly connected to the base electrode, having a housing including a first and second end plate and an outside wall connected thereto vacuum-tight, the base electrode being firmly connected to the first face plate, and having at least two spacer rods.

2. Description of the Related Art

A stripline laser of the type described above is disclosed by European Published Application 0 477 865.

Until a few years ago, insurmountable difficulties opposed the design of compact, $CO_2$ high-performance lasers. Due to the physical processes in the laser excitation, the efficiency of the lasers is highly dependent on the temperature of the gas not becoming excessively high, i.e., on an effective elimination of excess heat from the laser gas during its operation. It has been shown in diffusion-cooled $CO_2$, lasers, wherein the heat is carried away by a stationery thermal conduction process from the hottest location in the center of the laser plasma to the cooled walls of the discharge vessel, that the output laser power is only dependent on the length and not on the diameter of the discharge. As a result, complicated convolution concepts were developed, on the one hand, to retain the compact dimensions of the laser despite powers into the kW range. On the other hand, quickly flooded, i.e., convection-cooled, lasers were developed. Quickly flooded lasers in the power category 500 through more than 10,000 Watts are currently commercially available. These lasers, which are not constructed for sealed-off operation, however, are bulky, have a high power-associated weight, and are dependent on a costly external gas supply and on pumping for fast gas circulation.

For these reasons, the only compact, diffusion-cooled $CO_2$ lasers available have been lasers of the type referred to as waveguide lasers that have powers up to 200 Watts.

The fundamental principles of a stripline laser are disclosed in European Published Application 0 305 893 in which the discharge space thereof is not of a quadratic cross-section, by contrast to waveguide lasers, but instead is shaped on planar waveguide structures that are open toward the side. The combination of such a quasi-one-dimensional waveguide with an unstable resonator in the orthogonal direction thereby results in a diffraction-limited fundamental mode laser emission. In the stripline laser, heat is absorbed over a large area by closely adjacent electrodes, from which the heat is eliminated with the assistance of suitable coolants. It is, therefore, not necessary to pump the laser gas itself through the discharge space with a special cooling circulation means.

The article by R. Nowack et al., "Diffusionsgekühlte $CO_2$ Hochleistungs-laser in Kompaktbauweise" in "Laser und Optoelektronik", 23 (3)/1991, sets out the state of the art in stripline laser technology. Up to now, considerable difficulties have opposed the conversion of the above-described stripline laser concept into a practical design. The selection of a suitable electrode material and assuring the mechanical stability of the resonator structure vis-a-vis thermal stresses has proved to be especially problematical. For resolving the former problem area, a copending U.S. application filed simultaneously herewith and corresponding to European Patent Application No. 92114862.3 bearing the title "Stripline Laser with Compound Electrodes" is referenced and is herewith incorporated into the present disclosure.

SUMMARY OF THE INVENTION

An object of the present invention is to provide a laser of the type cited above with which the described disadvantages can be largely avoided without great structural outlay and, in particular, with which the two resonator mirrors can be kept at a constant spacing and in a constant angular position relative to one another regardless of the ambient temperature of the laser and regardless of the thermal stress on the laser electrodes and on the resonator mirrors.

This and other objects and advantages are inventively achieved in a stripline laser of the type initially cited in that the spacer rods have coolant flowing through them and define the invariable spacing of the two resonator mirrors lying opposite one another and that are directly firmly joined to the spacer rods.

Developments of the invention include the spacer rods proceeding inside the base electrode, which is hollow. The first resonator mirror, the spacer rods, a connecting member connected to the spacer rods outside the base electrode and the second resonator mirror secured thereon are cooled with a continuous, common coolant circulation. Spacer rods are connected to the base electrode with a retaining spring that only allows movement in an axial direction, being connected thereto at at least one location, preferably in the proximity of the second resonator mirror. The spacer rods are each respectively composed of an Invar hollow rod and of at least one, and preferably, two metal tubes, whereby all parts have a defined length and a defined coefficient of longitudinal expansion.

In an exemplary embodiment, the base electrode is moveable in an axial direction relative to the second face plate but is guided in a radial direction, whereby the spacer rods are passed through the second face plate without a fixed connection and are firmly joined to an adjustment flange arranged therebehind that is separated from the second face plate by an expansion gap, and whereby the second resonator mirror is firmly joined to the adjustment flange and is held in a defined position relative to the first resonator mirror. A vacuum-tight connection between the second face plate that is punctured toward the interior of the housing opposite the second resonator mirror and the adjustment flange, preferable the second resonator mirror, is formed by an expandable metal bellows. Preferably, at least one fit pin is provided between the second face plate and the adjustment flange in addition to the bellows, and this second face plate is moveable in an axial direction relative to the stationery adjustment flange. A retaining spring that is arranged between the adjustment flange and the second face plate and contacts them at offset locations is provided in addition to the bellows.

The base electrode is guided relative to the second face plate in a radial direction by a support that is firmly connected to the outside wall and is displaceably connected in axial direction to the base electrode. In one embodiment, the first resonator mirror is a cylindrical mirror surface and, close to the first face plate, resides perpendicularly on the base electrode with a tolerance of 5 angle seconds. The second resonator mirror is adjustably fashioned and is adjusted to an optimum position for laser operation with the first resonator mirror.

The metal tube of an exemplary embodiment is a stainless steel tube.

BRIEF DESCRIPTION OF THE DRAWINGS

The invention shall be set forth in greater detail below with reference to exemplary embodiments and the FIGURE of the drawing.

The sole FIGURE shows an embodiment of a resonator structure of the invention schematically and in section.

DETAILED DESCRIPTION OF THE PREFERRED EMBODIMENTS

It has been shown on the basis of signature calculations that, for achieving the goal described by the users of a power output of the laser that is constant up to ±1%, the thermal expansion of the resonator lengths must be limited by structural measures to at most 0.2 µm in order to achieve the mode purity required for the constant power output. Manufacturing tolerances of ±1.5 mm were thereby assumed. This lofty goal requires a number of design measures, particularly since a tilting of the resonator mirrors is to be prevented at the same time.

The FIGURE shows a vacuum-tight laser housing 1, 2 and 3 that is essentially composed to a first face plate 1, of a preferably cylindrical outside wall 2 and of a second face plate 3. The parts are preferably manufactured of stainless steel. The base electrode 4 firmly joined to the first face plate 1 as well as the RF electrode 5 arranged thereabove and connected to one another by spacers 6 are also shown. Both electrodes 4 and 5 are effectively cooled by the admission 7 and outflow 8 of cooling water having a temperature of approximately 20–25° C. as set forth in greater detail in the above-recited application filed of even date with the present application.

A cylindrical mirror 9 whose cylinder surface is aligned perpendicularly to the base electrode with a tolerance of ±5angle seconds resides perpendicularly on the base electrode 4 close to the first face plate 1. It forms the first resonator mirror 9. The second resonator mirror 10 is firmly connected to an adjustment flange 11 that is in turn connected via stationery spacer rods 12 to the first face plate 1 and, thus, is indirectly connected to the base electrode 4 and the first resonator mirror 9. The at least three spacer rods 12 are welded together of an Invar hollow rod 13 and two outwardly disposed stainless steel tubes 14. The Invar hollow tube 13 that already inherently exhibits extremely low longitudinal expansion is additionally water-cooled, just as are the steel tubes 14. The various thermal expansion paths that are relevant for the resonator structure can be compensated to zero by the coolant-traversed, composite spacer rods 12, assuming the temperatures of all elements contributing to the spacing change are either exactly defined or the elements themselves have a coefficient of expansion extremely close to zero. The length of the steel tubes 14 is to be of such dimensions that their expansion defined as a consequence of their coefficient of longitudinal expansion just compensates the sum of all other longitudinal expansions. In detail, a calculation for an Invar hollow rod 13 that is 370.5 mm long yields a required length of 17.5 mm for the V2A steel compensation element 14. This structure guarantees a spacing variation of the resonator mirrors 9 and 10 inserted in this way into a stationery resonator structure of less than 0.2 µm. The temperature distribution and the mechanical stability in the laser housing thus become largely insensitive to external temperature influences. On the basis of a corresponding dimensioning, the stationery resonator structure determines the spacings of the resonator mirrors 9 and 10 independently of temperature differences and warpings in the outside wall 2 of the housing connected therewith.

The compensation relates not only to fluctuations in the outside temperature but also to fluctuations in the temperature of the cooling water. The spacer rods 12 are charged with the same cooling water parallel to the electrodes 4 and 5. Given a change in the temperature of the cooling water, the expansions of the spacer rods 12 compensate with those of the spacing between the first resonator mirror 9 and the first face plate 1, as well as the distance between the second resonator mirror 10 and the point of contact between the spacer rod 12 and adjustment flange 11. A spacing variation that still derives overall during the transient phase of the laser due to a change in the temperature of the cooling water can be substantially reduced in that the time constants of the heating-up event of the individual sub-distances are matched to one another. To that end, the cross sections of the participating, cooled elements must be exactly defined and the water distributor 25 and the other elements must be matched to one another with respect to parameters such as material, flow rate, etc.

It may be seen in the FIGURE that the spacer rods 12 are conducted through the second face plate 3 without a firm connection and are firmly joined to the adjustment flange 11 arranged therebehind, this being separated from the second face plate 3 by an expansion gap 15. Since the second face plate 3 is movable in an axial direction but guided in a radial direction and since the second resonator mirror 10 is firmly joined to the adjustment flange 11, a constant angular position of the two resonator mirrors 11 and 12 relative to one another derives overall.

It is advantageously possible in a simple way to mount the second resonator mirror 10 so that it is adjustable and to adjust it to a position that is optimum for the laser operation with the first resonator mirror 9. This, for example, can occur with adjustment screws 16 shown in the FIGURE for adjusting the second resonator mirror 10 at the adjustment flange 11.

The second face plate 3 is provided with an opening 17 opposite the second resonator mirror 10, so that it is beneficial for producing a vacuum-tight connection between the interior of the housing and adjustment flange 11 to provide an expandable metal bellows 18 that is shown in the FIGURE. The metal bellows 18, for example, can be composed of copper that is 0.2 mm thick. For assisting the bellows 18, it is advantageous—as shown in the FIGURE—to provide at least one fit pin 19 between the second face plate 3 and the adjustment flange 11, so that the second face plate 3 is movable in an axial direction relative to the stationery adjustment flange 11. Alternatively to the fit pin 19, a retaining spring that is arranged between adjustment flange 11 and the second face plate 3 and contacts the two parts at offset points can also be provided, this not being shown in the FIGURE.

Despite the effective cooling of the electrodes 4 and 5 and even though the cylindrical outside wall 2 is surrounded with a cooling coil 20, the outside wall is still subject to a slight temperature difference whose mechanical influences must be taken into consideration. Due to the expandable bellows 18 and the expansion gap 15 that are provided, the cylindrical outside wall 2 can migrate in the direction toward the adjustment flange 11 given thermal expansion, whereas the mirror spacing nonetheless remains constant. It is beneficial to guide the base electrode 4 relative to the second face plate 3 in a radial direction by a support 21 that is firmly connected to the outside wall 2 and is connected to the base electrode 4 in a way to be displaceable in an axial direction. This support 21 can be provided with ondular washers 23 because of the different longitudinal expansions of outside wall 2 and rectangular electrode carrier part 22. On the basis of an oblong hole in the rectangular profile, the support 21 holds, on one hand, the connection between the outside wall 2 and the rectangular tube 22 which carries the actual electrode part 24; on the other hand, however, the two parts are adequately displaceable relative to one another.

Accordingly to a second, basic embodiment of the invention that is not shown in the FIGURE, the resonator can also be an internal resonator, whereby at least two spacer rods proceed partially inside the hollow base electrode. As a result thereof, the resonator can be arranged inside the vacuum-tight housing, this being less complicated. Moreover, the first resonator mirror, the spacer rods, a copper connecting member connected to the spacer rods outside the base electrode, and the second resonator mirror secured thereon can be cooled with a continuous, common coolant circulation. The spacer rods should be coupled to the electrode profile with a retaining spring in the proximity of the second resonator mirror. The retaining spring can be fashioned as a leaf spring to allow movement in an axial direction of the spacer rods relative to the electrode profile but prevent movements in a radial direction. In order to increase the resonant frequencies of the spacer rods given excitations in radial direction, further retaining springs can be attached between electrode profile and spacer rods.

Although other modifications and changes may be suggested by those skilled in the art, it is the intention of the inventors to embody within the patent warranted hereon all changes and modifications as reasonably and properly come within the scope of their contribution to the art.

We claim:

1. A radio frequency, diffusion-cooled stripline laser, comprising:
    first and second metal electrodes, said first metal electrode being a base electrode;
    means for mounting said first and second metal electrodes to define a discharge gap therebetween;
    means for cooling said first and second metal electrodes;
    an unstable resonator including first and second resonator mirrors at respective opposite ends of said discharge gap, said first resonator mirror being affixed to said first metal electrode and said second resonator mirror being free of said first metal electrode;
    a housing including first and second face plates and an outside wall connecting said first and second face plates to form a vacuum tight enclosure enclosing said first and second metal electrodes and said unstable resonator, said first face plate being connected to said first electrode;
    a plurality of spacer rods defining a coolant space within said spacer rods and said first and second resonator mirrors being firmly indirectly connected to said spacer rods to define an invariable spacing of said first and second resonator mirrors; and
    coolant traversing said plurality of spacer rods within said coolant space.

2. A radio frequency diffusion-cooled stripline laser as claimed in claim 1, wherein said first electrode is hollow and thus defines a hollow interior of said first electrode and said plurality of spacer rods extend within said hollow interior of said first electrode.

3. A radio frequency diffusion-cooled stripline laser as claimed in claim 2, further comprising:
    a connecting member connected to said plurality of spacer rods outside said first electrode, wherein said second resonator mirror is mounted on said plurality of spacer rods, said coolant circulates to cool said first and second resonator mirrors, said plurality of spacer rods and said connecting member.

4. A radio frequency, diffusion-cooled stripline laser as claimed in claim 2, wherein said spacer rods are connected to said base electrode with a retaining spring that only allows movement in an axial direction, being connected thereto at at least one location.

5. A radio frequency, diffusion-cooled stripline laser as claimed in claim 1, wherein said spacer rods each comprise an invar hollow rod and at least one metal tube having a defined length and a defined coefficient of longitudinal expansion.

6. A radio frequency, diffusion-cooled stripline laser as claimed in claim 1, wherein said base electrode is moveable in an axial direction relative to said second face plate but is guided in a radial direction, wherein said spacer rods are passed through said second face plate free of a fixed connection and are firmly joined to an adjustment flange arranged therebehind that is separated from said second face plate by an expansion gap, and wherein said second resonator mirror is firmly joined to said adjustment flange and is held in a defined position relative to said first resonator mirror.

7. A radio frequency, diffusion-cooled stripline laser as claimed in claim 1, wherein a vacuum-tight connection between said second face plate that is open toward an interior of said housing opposite said second resonator mirror and said adjustment flange is formed by an expandable metal bellows.

8. A radio frequency, diffusion-cooled stripline laser as claimed in claim 7, further comprising:
    at least one fit pin between said second face plate and said adjustment flange in addition to said bellows, and said second face plate is moveable in an axial direction relative to said stationery adjustment flange.

9. A radio frequency, diffusion-cooled stripline laser as claimed in claim 7, further comprising:
    a retaining spring arranged between said adjustment flange and said second face plate and contacts them at offset locations is provided in addition to said bellows.

10. A radio frequency, diffusion-cooled stripline laser as claimed in claim 1, wherein said base electrode is guided relative to said second face plate in a radial direction by a support that is firmly connected to said outside wall and is displaceably connected in an axial direction to said base electrode.

11. A radio frequency, diffusion-cooled stripline laser as claimed in claim 1, wherein said first resonator mirror is a cylindrical mirror surface and, close to said first face plate, lies perpendicularly on said base electrode with a tolerance of 5 angle seconds.

12. A radio frequency, diffusion-cooled stripline laser as claimed in claim 1, wherein said second resonator mirror is adjustably mounted and is adjusted to an optimum position for laser operation with said first resonator mirror.

13. A radio frequency, diffusion-cooled stripline laser as claimed in claim 1, wherein said metal tube comprises a stainless steel tube.

* * * * *